Jan. 10, 1956 G. G. GRUETTNER 2,729,892
MULTI-RATIO ENGRAVING MACHINE AND WORKHOLDER THEREFOR
Filed Nov. 4, 1950 8 Sheets-Sheet 1

Fig. 1.

INVENTOR
Gerhard G. Gruettner
BY
ATTORNEY

Jan. 10, 1956  G. G. GRUETTNER  2,729,892
MULTI-RATIO ENGRAVING MACHINE AND WORKHOLDER THEREFOR
Filed Nov. 4, 1950  8 Sheets-Sheet 4

INVENTOR
Gerhard G. Gruettner
BY
ATTORNEY

Jan. 10, 1956  G. G. GRUETTNER  2,729,892
MULTI-RATIO ENGRAVING MACHINE AND WORKHOLDER THEREFOR
Filed Nov. 4, 1950  8 Sheets-Sheet 5

INVENTOR
Gerhard G. Gruettner
BY
J. Basseches
ATTORNEY

United States Patent Office

2,729,892
Patented Jan. 10, 1956

2,729,892

MULTI-RATIO ENGRAVING MACHINE AND WORKHOLDER THEREFOR

Gerhard G. Gruettner, New York, N. Y., assignor to New Hermes Engraving Machine Corporation, New York, N. Y., a corporation of New York Application November 4, 1950, Serial No. 194,163

6 Claims. (Cl. 33—25)

This invention relates to tracer-guided engraving machines and more particularly to portable engraving units, and still more particularly to multi-ratio tracer-guided portable engraving machines and workholders therefor.

It is an object of my invention to provide a relatively light-weight portable tracer-guided engraving machine wherein an inexperienced operator may accomplish engraving simply by tracing from a grooved master template, and including among the features thereof a multi-ratio tracer arm assembly or pantograph which permits speed change of character sizes at will, to allow for a wide range of engraving sizes from one master template, without disassembling the accurately constructed tracer arm as to the pivots joining the arms of the pantograph whereby accurate ratio conversion is assured with the use of a single template.

Still more particularly it is an object of this invention to provide a tracer-guided portable engraving machine wherein a multi-ratio tracing arm is provided in combination with a workholder in which the center of the workholder, in relation to the master, remains the same, whereby irregularly shaped articles to be engraved may be quickly set-up for the engraving work and accuracy of position assured in a simple and expedient manner.

Still more particularly it is an object of this invention to provide a tracer-guided portable engraving assembly which has a wide working range with regard to the cutter, the work and the master template. Still more particularly, it is an object of my invention to combine in a tracer-guided engraving device of portable character, a multi-ratio engraving arm whereby a variety of sizes of engraving work may be executed from one master template, including, in combination therewith, a work holder which is self-centering whereby relatively unskilled labor may quickly and efficiently interchangeably mount the objects to be engraved centered with relation to the template, quickly and economically to carry out the engraving operation.

The invention particularly has as its object to provide a tracer-guided portable engraving device which is versatile in its application of the tracing from a template with regard to the outline and size of the engraving from a single master template, and whereby small as well as more bulky objects may be held within the workholder accurately and symmetrically, by a simplified series of steps whereby inexperienced operators may secure a tracing engraving for a large capacity of variants in sizes and shapes of articles.

My invention further contemplates the provision of workholders or clamping units for cylindrical objects to be held in relation to the engraving mechanism whereby rapid clamping of differently shaped objects, such as trophy cups, may be accurately and quickly mounted and the engraving work performed employing a simple number of templates, and to change from one article to another quickly and efficiently.

To attain these objects and such further objects as may appear herein, or be hereinafter pointed out, I make reference to the accompanying drawing forming a part hereof, in which—

My invention may be summarized as providing an engraving machine combining a work holder and indicia holder with a novel multi-ratio pantographic tracer arm and engraving tool assembly having a guide therefor adjustably positionable and with the tracer arm of fixed length whereby slidably mounting the guide and assembly with respect to the base therefor will correspondingly position the engraving tool holder and tracer arm point on the work holder and indicia holder and, specifically, provide a guide supporting the pantograph assembly having a path of adjustment axially aligned with the workholder and indicia holder, whereby multi-ratio work may be effected from a single template without change of the tracer arm and linkage arms of the parallelogram assembly, including, also, novel work holding clamps and supports on a base for the assembly whereby a single template assembly on a carriage may be readily adapted to various work pieces to be engraved, to locate the engraving on said work pieces with great facility by relatively unskilled labor.

My invention also provides, in combination with a multi-ratio pantographic assembly engraving machine, operating with relation to selected size of template members, a work holder mounted to clamp the work axially which is selectively adjustable transversely or in parallel, in relation to an indicia or template carriage to permit a wide variety of engraving operations to be performed with facility.

Making reference to the drawings, the engraving assembly 10 comprises a base 11 having a central web supported table 12, and radiating rearwardly directed arms 13 and 14 and forwardly directed arms 15 and 16, terminating in footed portions 17. The rearwardly directed arms 13 and 14 have upwardly extended standards 18 and 19, the upper ends whereof horizontally support a cross beam 20 and tie rod 21 therebetween. Over the standard 18 bracket 22 erectly supports the pivot pin 23, on which is mounted the outrigger arm 24 pivotally at its end 25. A motor 26 is mounted on the swinging end 27 of the arm 24, which is biased to swing rearwardly by the coiled spring 28 whose ends 29 and 30 are anchored on the bracket 22 and arm 24, respectively.

Figures 6, 7, 8:
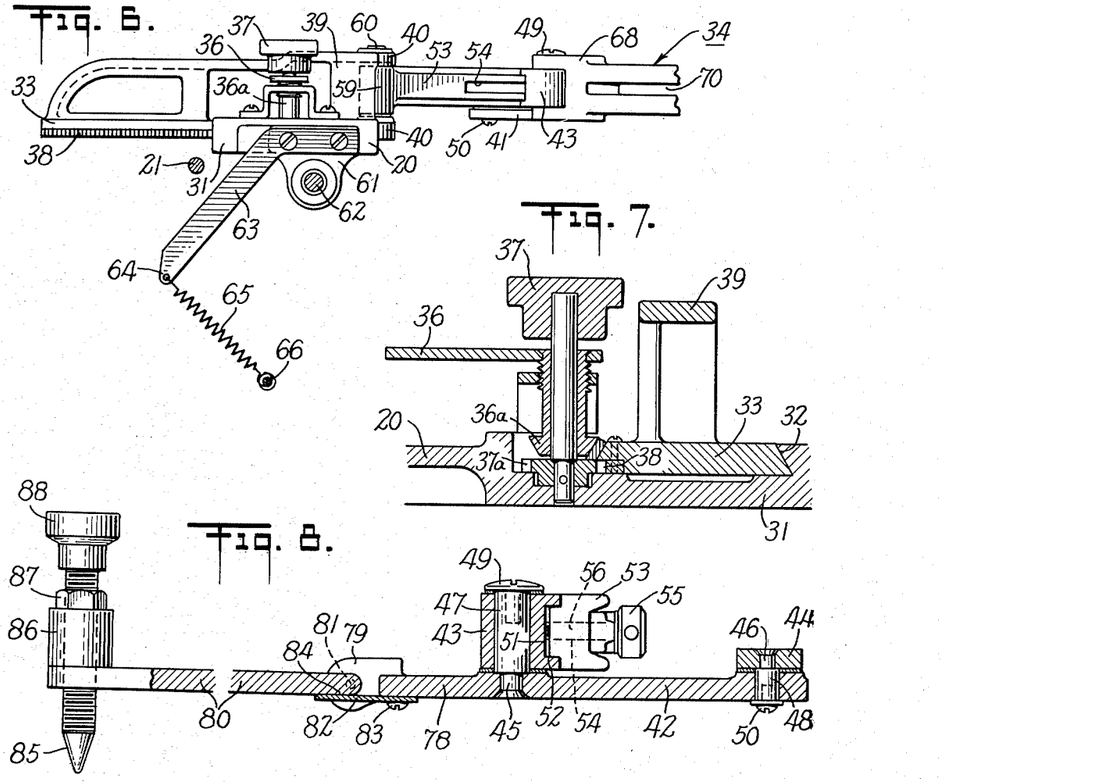
Figure 6 is a section taken on the line 6—6 of Figure 5.
Figure 7 is a fragmentary section taken on the line 7—7 of Figure 5.
Figure 8 is a fragmentary enlarged section taken on the line 8—8 of Figure 5.
Figure 9:
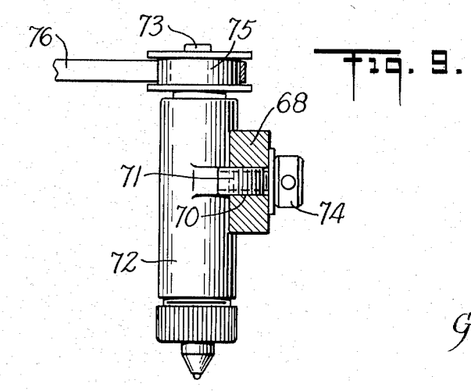
Figure 9 is a section taken on the line 9—9 of Figure 5.

The cross bar 20 is formed centrally thereof with a guide extension 31 having a guide slot 32 in which is slidably and adjustably mounted the slide mount 33 for the tracer assembly 34. Indicia markings 35 are formed on one edge of the edges defining the guide slot 32. A guide adjusting clamp 36 and pinion driving knob 37 for the rack bar 38 operate the clamp sleeve 36a and pinion 37a, and serve to maintain the slide 33 in adjusted position along the axial line centrally of the base in the guide slot 32. The slide mount 33, at its inner end 39, is formed with the spaced pivot bearings 40 for supporting the pantograph assembly 34 comprising the inner and outer end arms 41 and 42 and the inner and outer side arms 43 and 44 fixedly and pivotally connected to each other by the pivot pins 45 and 46 extending through the ends of the side arms 43 and 44, respectively. The pivot pins 45 and 46 are provided with bearing sleeves 47 and 48 to assure accurate pivotal movement, and the arms 43 and 44 are held to the end arms 41 and 42 in this relation by the headed screws 49 and 50, respectively. The side arm 43 overlies the arms 41 and 42 and has its inner face 51 formed with a guide slot 52, slidably and adjustably to support the pantograph extension arm 53 (see Fig. 8). The extension arm 53 is formed with a longitudinal slot 54 through which the turn-bolt clamp 55 is directed. The turn-bolt clamp has the bolt shank thereof 56 fixedly mounted in the arm 43. The indicia 57 on the arm 53 may be sighted in adjusted position with the arm 43 by employing the scale 58 thereon. The opposite end 59 of the arm 53 is connected by the cross pin 60 to the bearings 40 previously described.

The bar 20 is formed with pivoted ears 61 to each end thereof, pivotally mounting the assembly upon the cross shaft 62 supported between the standards 18 and 19. An extension arm 63 has its end 64 connected by a spring 65 to an anchoring pin 66 on the standard 18, tiltably supporting the cross bar 20 and the tracer assembly carried thereby within limits of movement upwardly or downwardly of the interposed guide rod 21. The motor arm 24 is limited in its rearward swinging movement by the stop 67, extended from the top of the standard 18.

Figure 5:
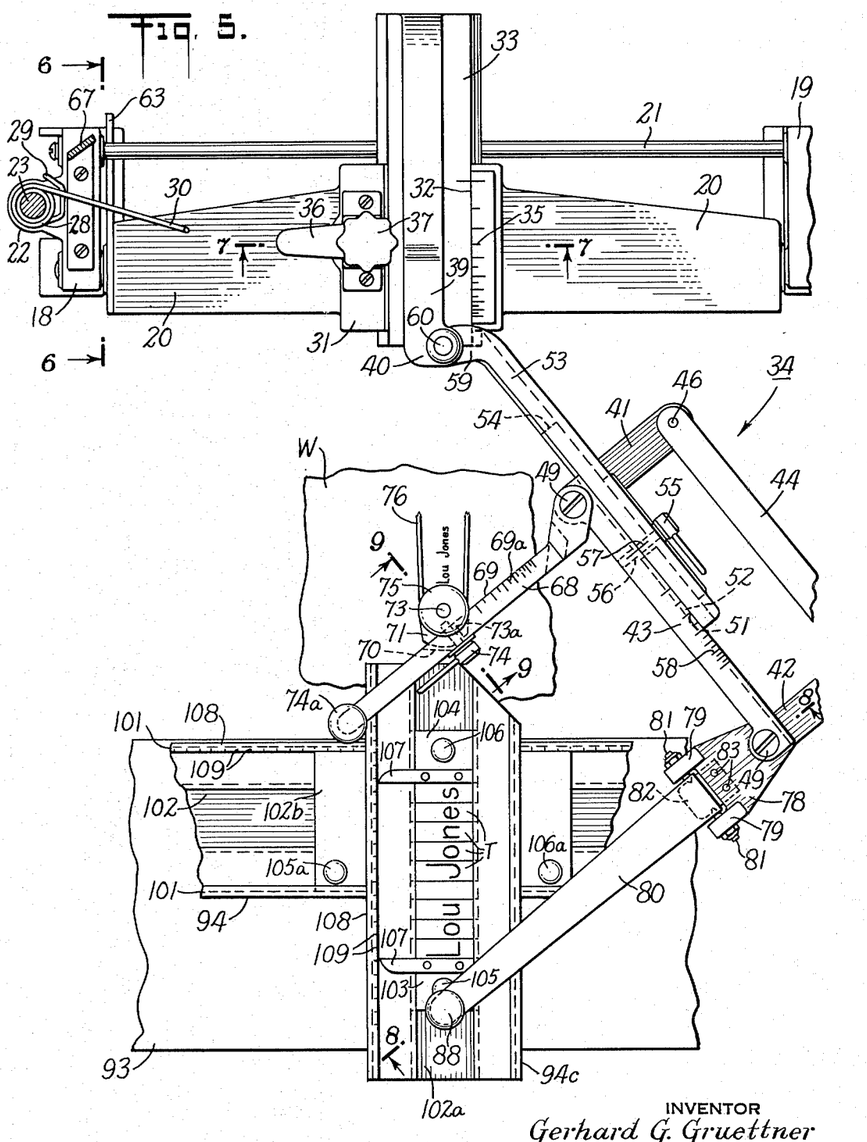
Figure 5 is an enlarged fragmentary elevation taken in the direction of the arrows 5—5 of Figure 3.
Figure 17:
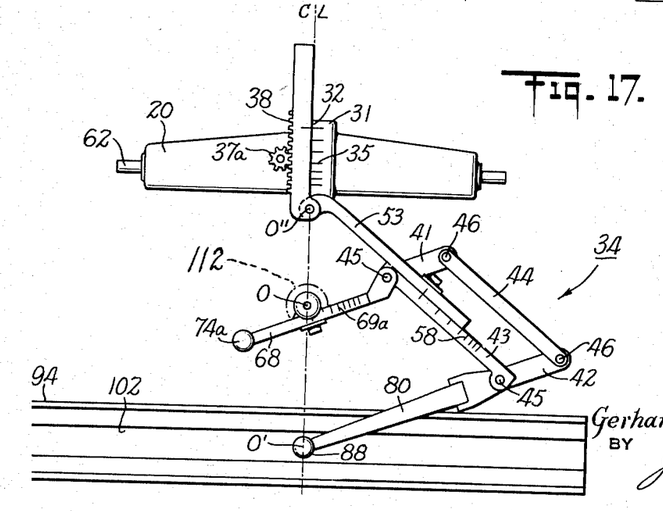
Figure 17 is a diagrammatic layout of the multi-ratio pantographic assembly.

Referring now to the pantograph assembly 34 (see Figs. 5 and 17), the end arm 41 is formed with an extension 68 which is rigid with the end arm 41 and has a side face 69 offset inwardly from the axial line through the pivot points of the pins 45 and 46, respectively. A longitudinal slot 70 has slidably mounted thereon the bracket 71, extending from the casing 72 of the cutter spindle 73. A handle turnbolt 74 engages the bracket 71 and passing through the slot 70 adjustably holds the cutter spindle along the arm 68, with the spindle 73 axially in alignment with the axis through the pivots 45 and 46, respectively. An indicator 73a may be aligned with the scale 69a for reference in setting. The arm 68 terminates in a finger pressure button 74a. The cutter spindle 73 has keyed thereon a pulley 75, over which is threaded the bolt 76, coupled to the pulley 77 on the motor 26.

The pantograph arm 42 has rigidly extended therefrom the extension 78 terminating in the ears 79 for pivotally supporting the tracer arm 80 on the pivot pins 81. A spring plate 82 is connected by the screw 83 to the extension 78 to engage the flats 84 at the end of the tracer arm 80, to hold the same in selected extended or upwardly pivoted position. The arm 80 terminates in the mounting for a tracer pin 85, screw-threaded in the bushing 86 and held thereto by the lock nut 87. A pressure button 88 heads the tracer pin for manual pressure.

The forwardly extended arms 15 and 16 of the base 11 (see Figs. 3, 4 and 5) are formed with bosses 89 and 90, mounting the standards 91 and 92 for the template table 93. Upon the table 93 there is mounted a master template channel 94 which is affixed to the table 93 by guide fingers 95 and 96 extending over the edges 97 and 98 of the table 93. Knurled set screws 99 each pass through the fingers 95 and 96 and serve to clamp the channel 94 in adjusted position on the table 93, there being provided scale markings 100 on the upper face of the table 93 to indicate the adjusted position of the channel 94 relatively to the table 93 along the medial axial line of the assembly. A guide strip 94a affixed to the face of the table 93 interfits a slot 94b, to hold and guide the channel 94 along the medial axial line of the assembly.

The channel 94 has side flanges 101 to each edge thereof and a dove-tailed slot 102 along the length thereof, into which selectively and alternatively, keeper guides may be mounted. For an example of such keeper guides reference is made to Figure 5. These keeper guides 103 and 104 may be slidably mounted and to be retained in predeterminedly set position by the set screws 105 and 106, when this channel is used and which is the foundation for the assembly more specifically illustrated or which may be otherwise employed as hereinbelow described. The keeper guides 103 and 104 each have extended therefrom indicator portions 107 adjacent the edge 108, which edge is provided with graduations or indicia 109 and serve to outline the extensiveness of the master templates retained in the channel 94 between the flanges 101. The relation of the guides in the position as illustrated will appear more clearly as this description proceeds.

Where it is desired to mount a series of master templates T transversely of the table 93, the keeper guides 103 and 104 previously described may be removed and substituted by a slidable block 102b having a dovetail contour. The block fits the channel 94 and is provided with set screws 105a and 106a to hold the same in fixed position. Mounted on the block 102b there is positioned the transverse channel 94c which in all respects conforms to the channel 94 and is likewise formed with a dove-tailed slot 102a to receive the keeper guides 103 and 104 thereon when removed from the channel 94 and retain therebetween the master type, instead of in the channel 102 previously described.

Figure 3:
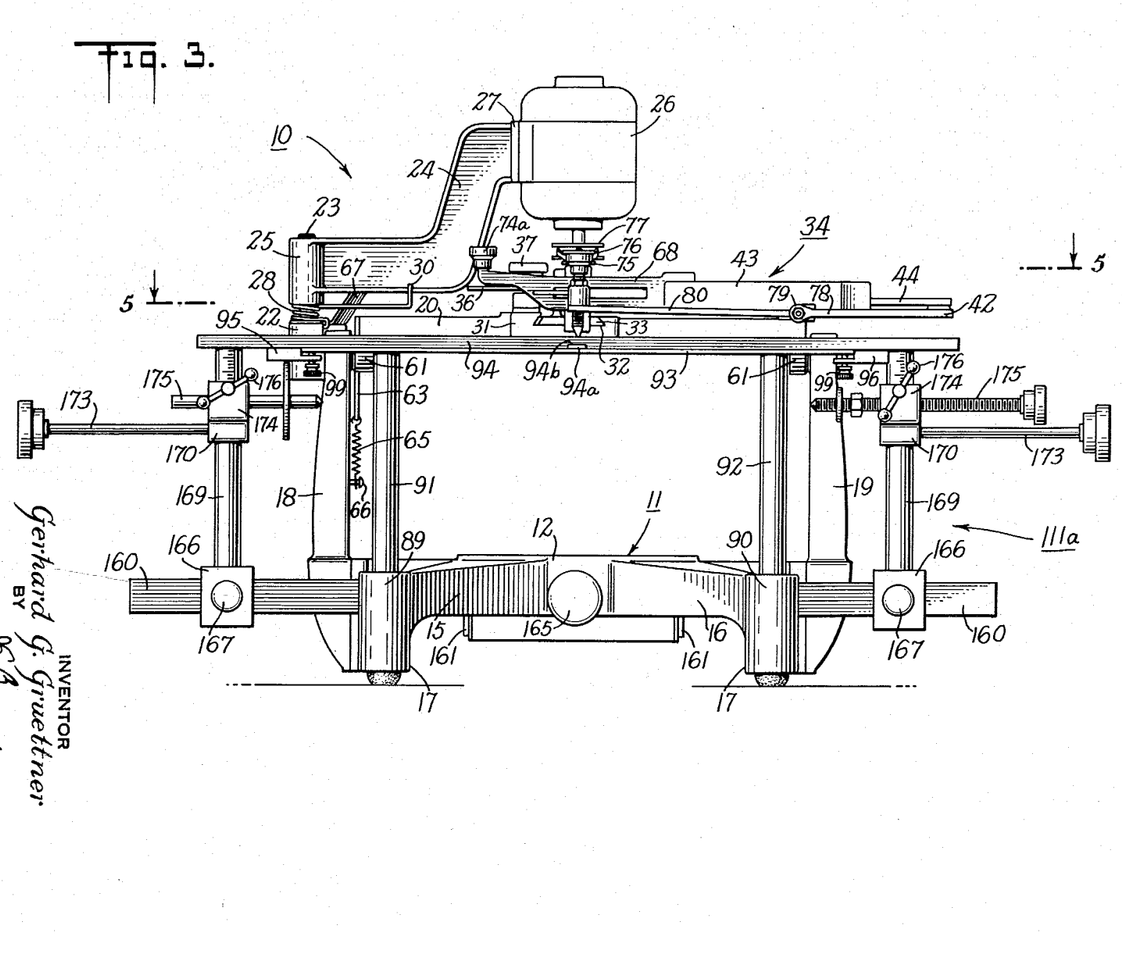
Figure 3 is a front elevation thereof.
Figure 4:
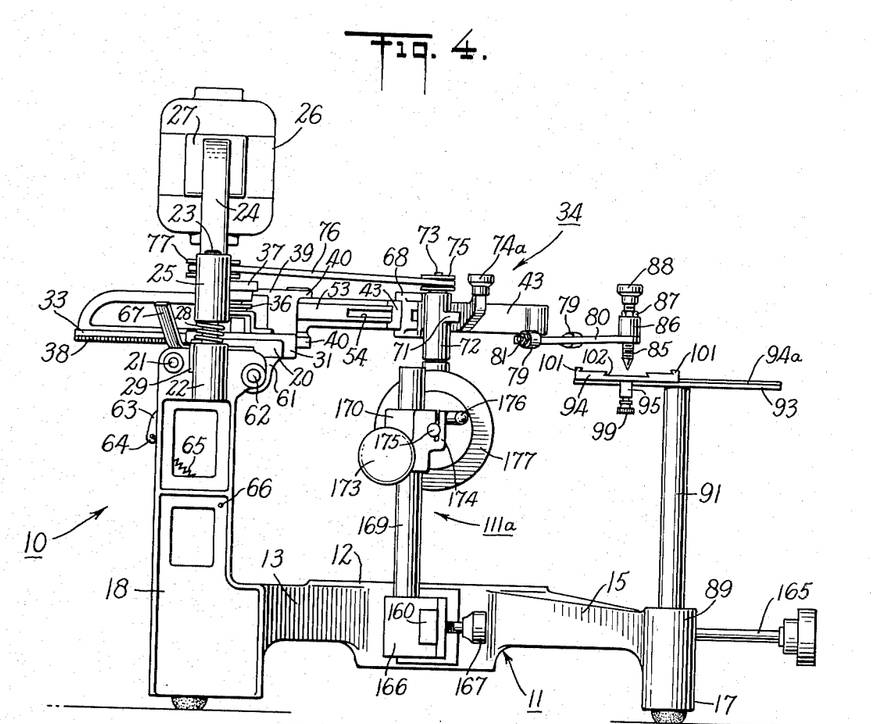
Figure 4 is a side elevation thereof.
Figures 13, 14, 15, 16:
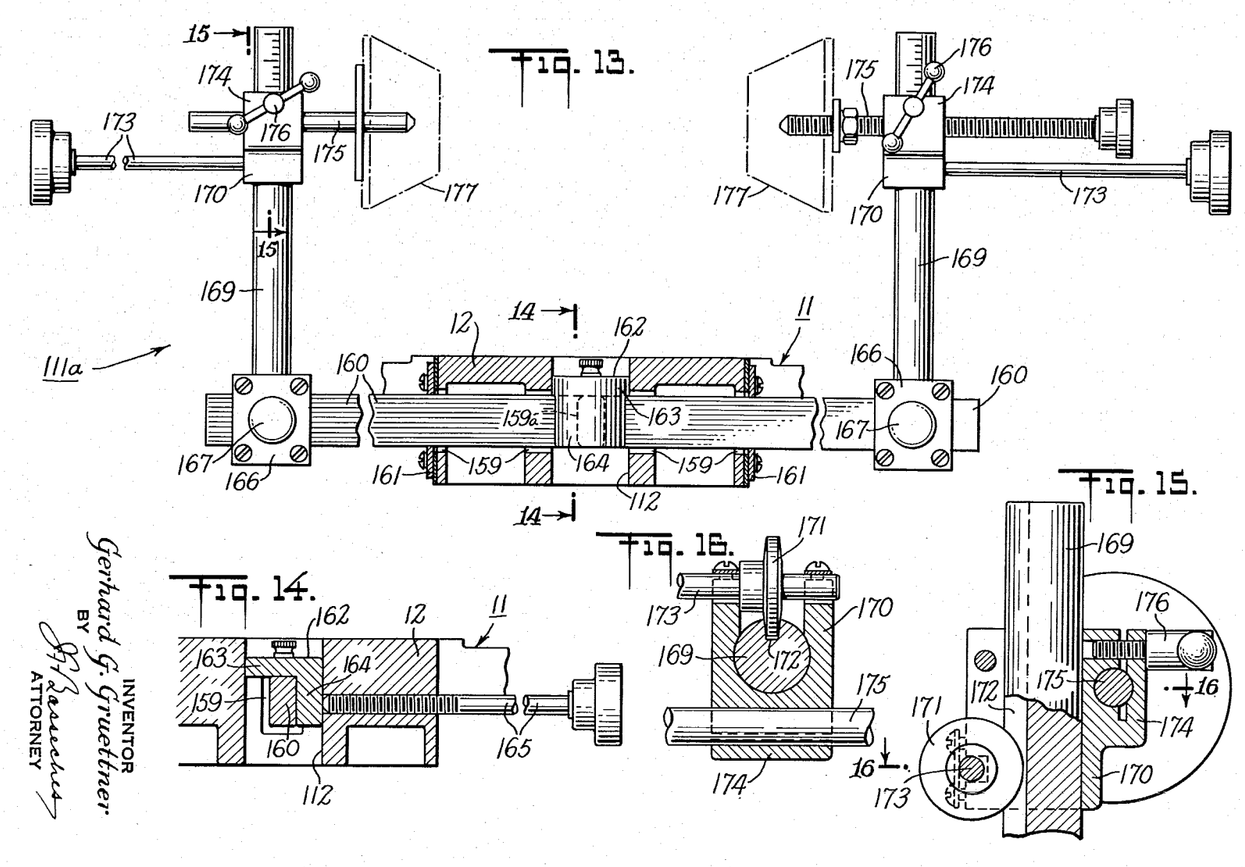
Figure 13 is an enlarged sectional view of a workholder shown in Figure 1.
Figure 14 is a section taken on the line 14—14 of Figure 13.
Figure 15 is a section taken on the line 15—15 of Figure 13.
Figure 16 is a section taken on the line 16—16 of Figure 13.

In connection with the assembly as provided, reference will now be made to the bed 11 (see Figs. 10 to 17) supporting the work holding fixtures 111 (see Figs. 10 and 11) and 111a (see Figs. 3 and 13).

The bed 11 is formed with a socket 112, the center O of which (see Fig. 17) lies on an axial line CL common to the center O' of the template carriage and the center of the pantograph mount O''. A set screw 113 (see Fig. 11) extends through a flange 114 into the boring of the socket 112 to engage the supporting column 115. The column has longitudinal grooves 116 and 117 an angle of ninety degrees apart for alternative engagement by the set screw 113 correspondingly to hold the column 115. The column 115 is provided with a slide guide 118, which latter is of dove-tail contour and has riding thereon, the bed 119 formed with a correspondingly shaped dove-tail slot 120. A turnknob 121 extends through a flange in the bed plate 119 for adjustably sliding the bed on the slide guide 118.

The bed 119 is formed at its upper face with a dove-tail slot 122, into which rides the carriage 123, having its lower section 124 and its upper section 125 of dove-tail contour. A knob controlled spindle 126 is supported on the friction bearing strip 127, extending in the cut-out 128 of the bed plate 119, and within this cutout there is positioned the wedge pulley 129, engaging a slot 130 on the section 124. A transverse carriage control 131 may fixedly hold the slide 123 against movement in the bed plate 119. End stops 132 limit the movement of the carriage 124, as well as to support the clamp jaw screw 133 by the knob 134.

The clamp jaw screw has threaded portions 135 and 136 of opposed pitch to engage the threaded heads 137 and 138 extending through the clamp jaws 139 and 140, having dove-tail portions riding on the upper section 125 of the carriage 123. The clamp jaws 139 and 140 are held in fixed relation to the carriage 123 by the tension in nuts 141, as will be readily understood.

Jaws 139 and 140 have aligned borings 142 and 143 into which extend the shanks 144 and 145 of the work holder adapters 146 and 147. Adjusting turn buttons 148 and 149 extend through the jaws to engage the shanks 144 and 145, and hold the adapters in adjusted position. The work holding jaws may each be formed with V- and arcuate-shaped seats 150 and 151, respectively, set off by the shoulder portions 152. Pins 153 project from the upper faces 154 to hold on the jaws other work holding adapters 155 (shown in dotted lines) cooperating with the shouldered portions 152 in accordance with the shape of the piece to be engraved.

The carriage 123 has a pointer 156 positioned in relation to the scale 157 to indicate spacial positioning of the carriage in relation to the bed 119. A guide 118 has a scale 158 to indicate spacial adjustment of the bed 119 of the carriage which is supported thereby relatively to the fixed guide 118.

It will be observed that work held between the jaws 139 and 140 or between the work adapters 146 and 147 may be moved spacially from the axial line of the bed 11 by movement of the carriage through adjustment of the turnknob 126 longitudinally of the carriage or transversely of the carriage by the turnknob 131, the set screw 121 being employed to lock the bed in transverse adjusted position, as will be readily understood.

Figures 10, 11, 12:
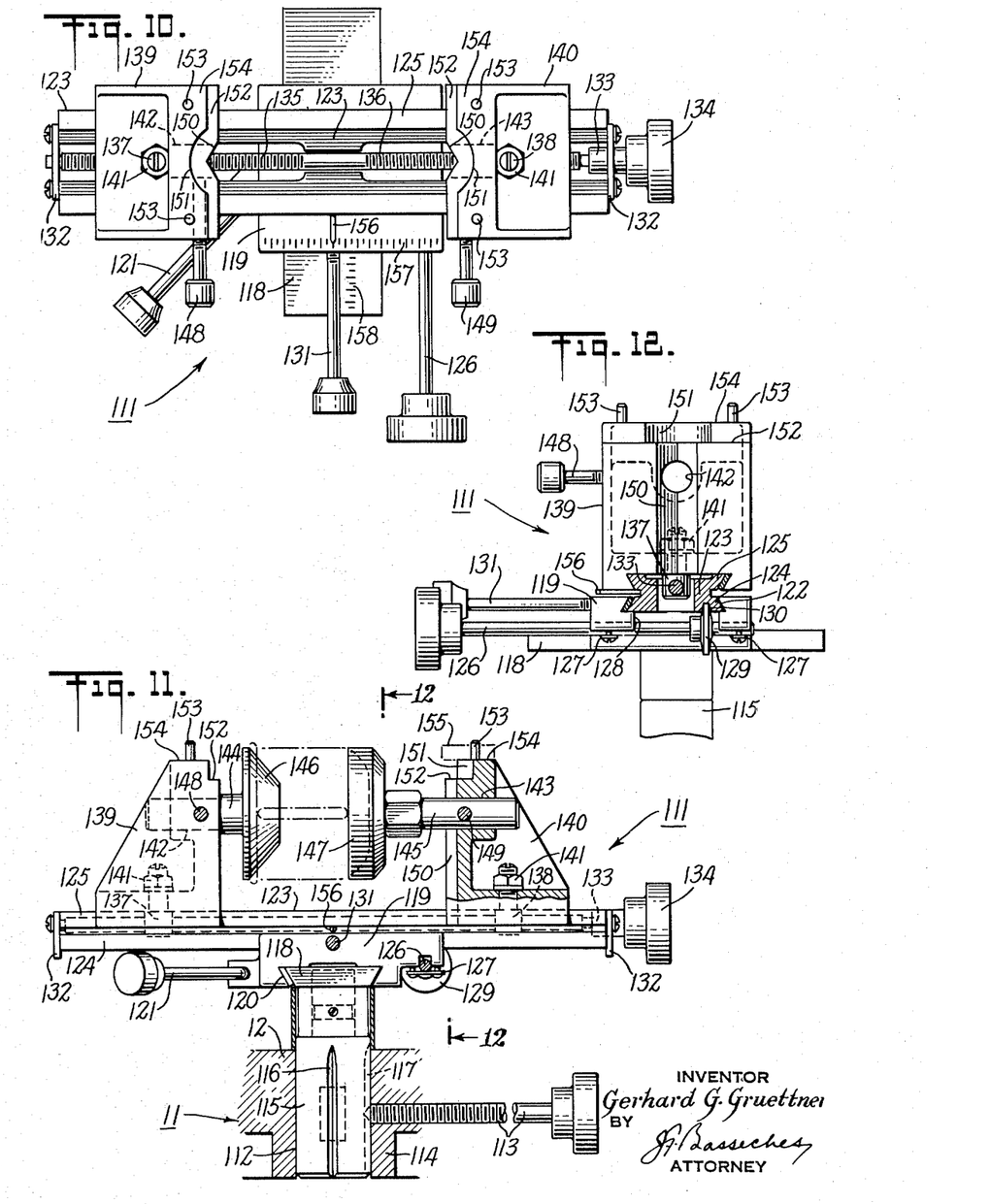
Figure 10 is a segregated plan view of a work holder.
Figure 11 is a side elevation thereof.
Figure 12 is a fragmentary section on the line 12—12 of Figure 11.

The workholder 111 described in Figures 10 to 12 may be employed for relatively small pieces to be engraved, and includes a guide axially supporting the carriage coincident with the axial line passing through the guide extension and pivot bearing 40 for supporting the pantograph assembly. Adjustment of the slide 118 and the bed 119 to refer to the zero reading of each of these scales is calculated to adjust the work held by the clamp centrally of the base and on the axial line extending through the slide mount 33 with which the pivot bearings 40 are coincident, as will be pointed out hereinbelow.

In Figures 1, 13 to 16 I have illustrated another form of work holder 111a having versatility of support of large pieces to be engraved. To support this construction, the web 12 of the base is formed with transverse slots 159 extending through the socket 112. A work holder carriage bar 160 is held axially transverse of the socket 112 by the finished plates 161. A plug 162, having a socket conforming head 163 and a side branch 164, may engage the upper edge and side of the bar 160, co-operating with the set screw 165 extending through the web 12 to clamp the bar 160 against longitudinal movement. The bar 160 and the mount therefor may extend in parallelism with the carriage 102, or transversely thereof, by the provision of slots 159a, thereby to orient the bar 160 longitudinally of the matrix carriage or transversely thereof, for purposes which will appear hereinafter.

Affixed to the bar I provide clamps 166, each formed with turnbuttons 167 for adjusting the clamps along the bar 160. The clamps 166 are formed with sockets 168 into which the standards 169 are erectly positioned. The standards 169 have mounted thereon the adjusting blocks 170 which hold the wedging pulley 171 in driving relationship to the tapered slot 172. A turn shaft 173 is keyed to the pulley 171, to adjustably mount the blocks 170 along the length of the standards. Each of the blocks 170 is provided with clamps 174 for the spindles 175. Screw-shanked turnknobs 176 serve to hold the spindle 175 in axially adjusted position.

Figure 1:
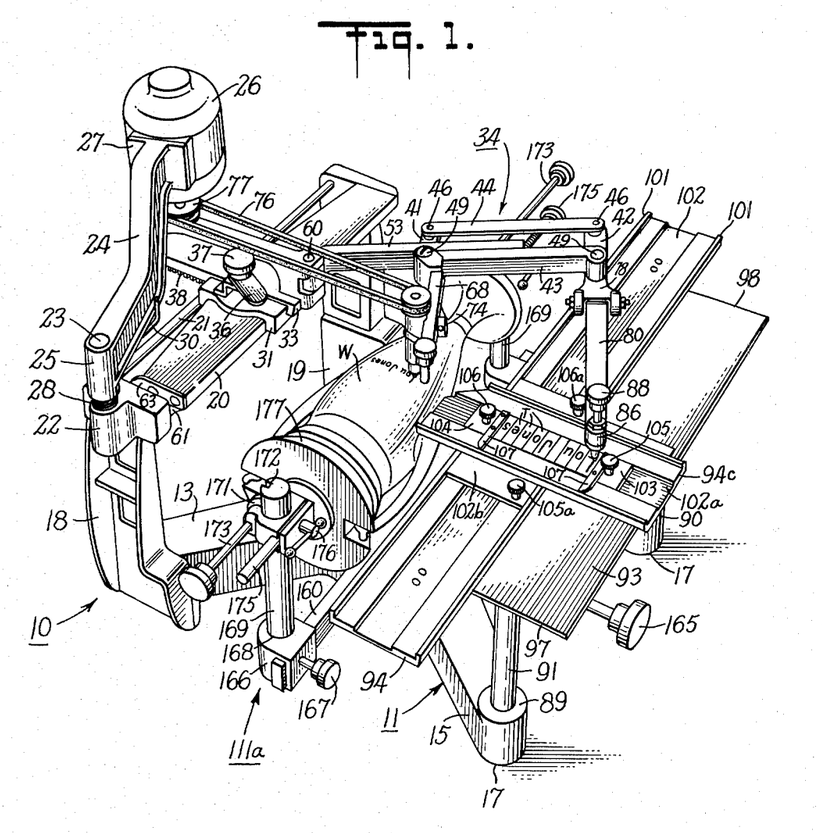
Figure 1 is a perspective view illustrating a tracer-engraving device and workholder, with a trophy cup mounted in position.
Figure 2:
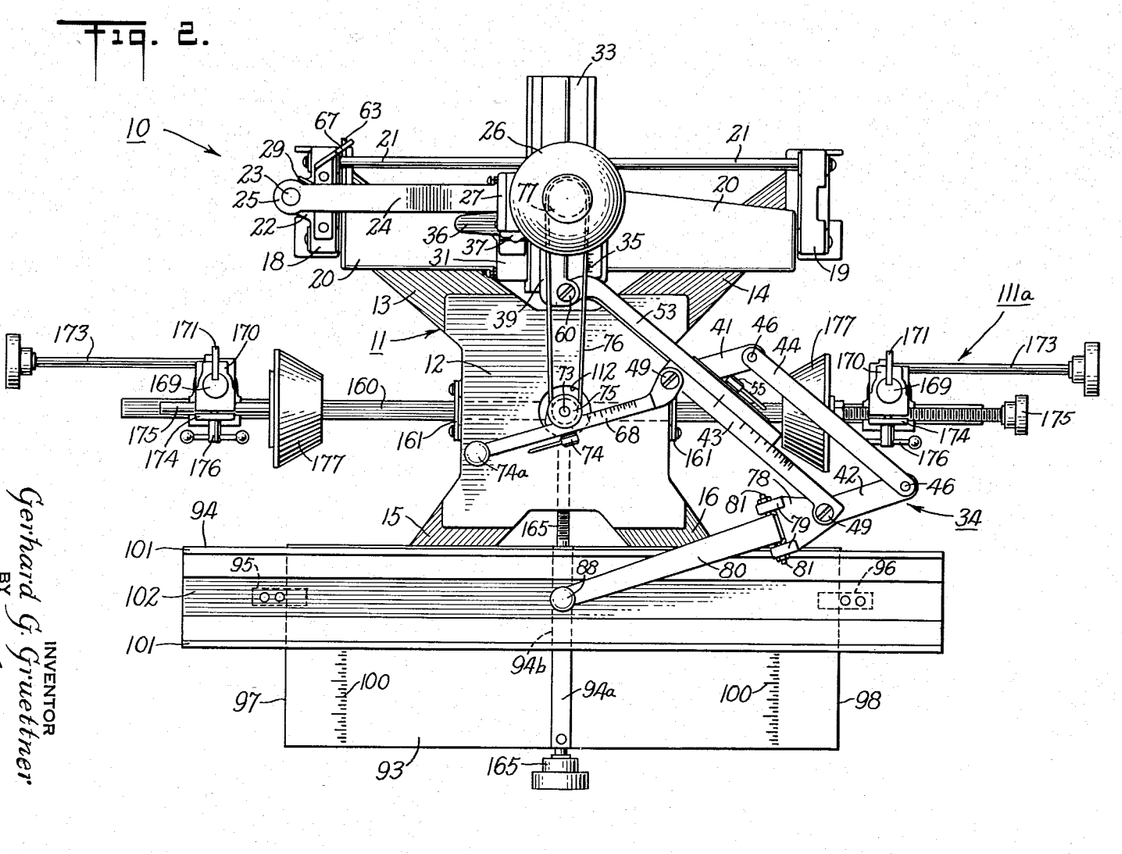
Figure 2 is a top plan view of the same, with the work removed.

The spindles 175 may have centered thereon conical work adapters 177 of different pitch and cross section to fit the base and mouth of cup-shaped articles to be engraved, such as the trophy illustrated in Figure 1. For this purpose, one or both of the spindles 175 may be screw threaded to adjust the same relatively to each other after rough adjustments of the standards 169 to each other, to accommodate the same to the cup-shaped article to be engraved.

In use, adapters to conform to the base and mouth of the cup-shaped trophy are positioned on the opposed spindles 175, with an adjustment of the standards 169 to each other to conform to the height of the cup-shaped article. Adjustment of the blocks 170 by the adjusting shaft 173 serves to adjust the surface of the trophy to bring the same substantially tangential to the template carriage and parallel to either carriage 102 or 102a, depending upon the position of the work holding bar 160 and the work holder carriage threaded in the base 11.

In the illustration shown in Figure 1, the work holder 111a of Figures 13 to 16 is exemplified. The trophy W in the form of a loving cup is positioned between a pair of conical adapters 177 to conform to the mouth and base thereof, and after preliminary adjustment of the clamps 166, frictionally to engage the trophy, vertical adjustment by the turnknobs 173 is effected to bring the center of the piece to be engraved coincident with the center of the base and to orient a transverse section to take the engraving in alignment with the center of the template or cup holder 102a.

It will be observed that the operation of my device permits of multi-ratio engraving work from the same master copy or template, without disassembly of the principal components. This will become more clear from reference to the diagrammatic illustration of the device in Figure 17 wherein corresponding parts have been graphically illustrated and given corresponding identifying reference characters.

The work to be engraved is centered on the work holder to have the axial line therethrough coincident with the axial line through the socket 112 of the base 11. The copy or template letters T are mounted on the carriage 102 so that this copy is centered on the carriage.

For reference purposes and with the minimum ratio reduction of the pantograph assembly, the slide 33 is adjusted to bring the zero reference mark to the minimum point of the indicia markings of the scale 35. The end 57 of the arm 53 may be adjusted with reference to the minimum marking of the scale 58. The cutter spindle 73 through the turnbolt 74 is correspondingly adjusted with reference to the scale 69a. A novel feature of the construction involves the positioning of the guide 33 to slide along a line intersecting with the axial line of the work holder and substantially the center of the copy holder, whereby it is necessary only to slide the pivot 60, the cutter spindle 73 and the pantograph assembly with regard to the length of the supporting arm 53, to procure a centering of the engraving tool holder and tracer arm correspondingly on the work holder and indicia holder. A corresponding adjustment of the indicator in reference to the scales 35, 58 and 69a to bring the pivotal support closer to the pantograph linkage and to bring the cutter closer to the same linkage without varying the length of the tracer arm will provide a change in the ratio of outline made by the cutter to the master template elements quickly and accurately, without distortion.

By retaining the tracer arm extending from the pantograph to the tracer point of constant length and retaining the parallelogram linkage arm of fixed length, the static moment in carrying out the engraving work does not change so that in use, with the same master template elements, engraving work of uniform characteristics is obtained.

By the retention and provision of the element of adjustment and variability in the parts comprising the pivot arm, the point of support of the pivot and the cutter arm extension, leaving the tracer arm constant, the same master template elements may be employed to secure a multi-ratio engraving effect quickly. The coordination of the line of adjustment of the guide with relation to the axial line of the work holder and the center of the indicia carriage permits of symmetry of engraving upon some work piece which may be accomplished quickly and efficiently, with relatively unskilled labor.

This application continues in part subject-matter of copending application Serial No. 194,164, filed November 4, 1950, which latter application is a continuation of application Serial No. 592,877, filed May 9, 1945, pending at the time of the filing of the present application but now abandoned.

Having thus described my invention and illustrated its use, what I claim as new and desire to secure by Letters Patent, is:

1. In an engraving machine or the like having a base, a workholder and a copyholder, the combination having a multi-ratio pantographic tracer arm and engraving tool assembly, said assembly comprising a parallelogram linkage of a pair of inner and outer end linkage arms, and a pair of inner and outer side linkage arms, each of which arms is of fixed length, with the alternate arms of each pair being joined pivotally to each other by pivot means and bearing means respectively, to join the parallelogram linkage in a parallelogram of fixed length members, extensions on each of the end linkage arms, one of which has slidable positioning means thereon to one side of the parallelogram linkage carrying an engraving tool, the other extension having pivot supporting means to one side of the parallelogram linkage, said last pivot supporting means including a fixed length tracer arm, a pantograph supporting extension arm slidably connected to one of said side linkage arms at one end of said extension arm, and pivot means for the assembly at the other end of said extension arm, a slide mount for said pivot means, guide means for said slide mount and means for supporting the assembly and work for relative movement to and from each other.

2. In an engraving machine or the like having a base, a workholder and a copyholder, the combination having a multi-ratio pantographic tracer arm and engraving tool assembly, said assembly comprising a parallelogram linkage of a pair of inner and outer end linkage arms, and a pair of inner and outer side linkage arms, each of which arms is of fixed length, with the alternate arms of each pair being joined pivotally to each other by pivot means and bearing means respectively, to join the parallelogram linkage in a parallelogram of fixed length members, extensions on each of the end linkage arms, one of which has slidable positioning means thereon to one side of the parallelogram linkage carrying an engraving tool, the other extension having pivot supporting means to one side of the parallelogram linkage, said last pivot supporting means including a fixed length tracer arm, a pantograph supporting extension arm slidably connected to one of said side linkage arms at one end of said extension arm and pivot means for the assembly at the other end of said extension arm, a slide mount for said pivot means, guide means for said slide mount and means for pivotally supporting said slide mount and guide means to direct the engraving tool carried thereby to and from the work, and variable means for feeding said slide mount along said guide means.

3. In an engraving machine or the like having a base, a workholder and a copyholder, the combination having a multi-ratio pantographic tracer arm and engraving tool assembly, said assembly comprising a parallelogram linkage of a pair of inner and outer end linkage arms, and a pair of inner and outer side linkage arms, each of which arms is of fixed length, with the alternate arms of each pair being joined pivotally to each other by pivot means and bearing means respectively, to join the parallelogram linkage in a parallelogram of fixed length members, extensions on each of the end linkage arms, one of which has slidable positioning means thereon to one side of the parallelogram linkage carrying an engraving tool, the other extension having pivot supporting means to one side of the parallelogram linkage, said last pivot supporting means including a fixed length tracer arm, a pantograph supporting extension arm slidably connected to one of said side linkage arms at one end of said extension arm and pivot means for the assembly at the other end of said extension arm, a slide mount for said pivot means, guide means for said slide mount and means for pivotally supporting said slide mount and guide means to direct the engraving tool carried thereby to and from the work, and variable means for feeding said slide mount along said guide means comprising a rack and pinion drive means.

4. In an engraving machine or the like having a base, a workholder and a copyholder, the combination having a multi-ratio pantographic tracer arm and engraving tool assembly, said assembly comprising a parallelogram linkage of a pair of inner and outer end linkage arms, and a pair of inner and outer side linkage arms, each of which arms is of fixed length, with the alternate arms of each pair being joined pivotally to each other by pivot means and bearing means respectively, to join the parallelogram linkage in a parallelogram of fixed length members, extensions on each of the end linkage arms, one of which has slidable positioning means thereon to one side of the parallelogram linkage carrying an engraving tool, the other extension having pivot supporting means to one side of the parallelogram linkage, said last pivot supporting means including a fixed length tracer arm, a pantograph supporting extension arm slidably connected to one of said side linkage arms at one end of said extension arm, and pivot means for the assembly at the other end of said extension arm, a slide mount for said pivot means, said slide mount having rectilinear guide means therefor positioned on a line common to the center of said work holder and copy holder, said guide means having support means which include bearing means bodily to feed the engraving tool to the work about the support means for said guide means.

5. In an engraving machine or the like having a base, a workholder and a copyholder, the combination having a multi-ratio pantographic tracer arm and engraving tool assembly, said assembly comprising a parallelogram linkage of a pair of inner and outer end linkage arms, and a pair of inner and outer side linkage arms, each of which arms is of fixed length, with the alternate arms of each pair being joined pivotally to each other by pivot means and bearing means respectively, to join the parallelogram linkage in a parallelogram of fixed length members, extensions on each of the end linkage arms, one of which has slidable positioning means thereon to one side of the parallelogram linkage carrying an engraving tool, the other extension having pivot supporting means to one side of the parallelogram linkage, said last pivot supporting means including a fixed length tracer arm, a pantograph supporting extension arm slidably connected to one of said side linkage arms at one end of said extension arm, and pivot means for the assembly at the other end of said extension arm, a slide mount for said pivot means, guide means for said slide mount and means for pivotally supporting said slide mount and guide means to direct the engraving tool carried thereby to and from the work, said base comprising a central web supporting table having work holding socket means centered on said base on a plane coincident with the central longitudinal axis of the slide mount.

6. In an engraving machine in accordance with claim 5 wherein said base includes rotative means for pivotally supporting said work holder.

(References on following page)

References Cited in the file of this patent

UNITED STATES PATENTS

| | | |
|---|---|---|
| 260,463 | Earle | July 4, 1882 |
| 695,069 | Martin | Mar. 11, 1902 |
| 885,428 | Brierley | Apr. 21, 1908 |
| 1,235,668 | Eaton | Aug. 7, 1917 |
| 1,692,103 | Williams | Nov. 20, 1928 |
| 1,734,573 | Gray | Nov. 5, 1929 |
| 1,964,319 | Gorton et al. | June 26, 1934 |
| 2,067,962 | Zwick | Jan. 19, 1937 |
| 2,198,635 | Rossman | Apr. 30, 1940 |
| 2,199,261 | Kapp | Apr. 30, 1940 |
| 2,240,825 | Alexender | May 6, 1941 |
| 2,481,658 | Gruettner | Sept. 13, 1949 |
| 2,565,821 | Makishima | Aug. 28, 1951 |
| 2,627,658 | Green | Feb. 10, 1953 |

FOREIGN PATENTS

| | | |
|---|---|---|
| 628,414 | Great Britain | Aug. 29, 1949 |